US012512708B2

(12) United States Patent
Lee et al.

(10) Patent No.: US 12,512,708 B2
(45) Date of Patent: Dec. 30, 2025

(54) STATOR FOR AN AFPM MOTOR AND A METHOD OF MANUFACTURING THE SAME

(71) Applicants: HYUNDAI MOTOR COMPANY, Seoul (KR); KIA CORPORATION, Seoul (KR)

(72) Inventors: Dong Hee Lee, Hwaseong-si (KR); Ji Yeon Kim, Yongin-si (KR); Sang Jin Park, Hwaseong-si (KR); Sung Gon Byun, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 211 days.

(21) Appl. No.: 18/369,620

(22) Filed: Sep. 18, 2023

(65) Prior Publication Data
US 2024/0106285 A1 Mar. 28, 2024

(30) Foreign Application Priority Data

Sep. 28, 2022 (KR) ........................ 10-2022-0123048

(51) Int. Cl.
*H02K 1/18* (2006.01)
*H02K 1/2798* (2022.01)
*H02K 15/02* (2025.01)
*H02K 15/12* (2025.01)
*H02K 16/02* (2006.01)

(52) U.S. Cl.
CPC ............... *H02K 1/18* (2013.01); *H02K 15/02* (2013.01); *H02K 15/12* (2013.01)

(58) Field of Classification Search
CPC ........ H02K 1/2798; H02K 1/18; H02K 15/02; H02K 16/02; H02K 15/12
See application file for complete search history.

(56) References Cited

U.S. PATENT DOCUMENTS

| 6,774,527 | B2 * | 8/2004 | Furuse | H02K 21/24 |
| | | | | 310/268 |
| 9,154,020 | B2 * | 10/2015 | Deguchi | H02K 1/182 |
| 9,350,206 | B2 * | 5/2016 | Wang | H02K 21/24 |
| 9,496,776 | B2 * | 11/2016 | Woolmer | H02K 5/203 |
| 10,050,480 | B2 * | 8/2018 | Köhler | H02K 1/182 |
| 11,387,710 | B2 | 7/2022 | Vansompel et al. | |
| 11,482,905 | B2 * | 10/2022 | Whaley | H02K 3/50 |

(Continued)

FOREIGN PATENT DOCUMENTS

| EP | 1526630 B1 | 8/2012 |
| EP | 3485558 B1 | 12/2019 |

(Continued)

*Primary Examiner* — Burton S Mullins
(74) *Attorney, Agent, or Firm* — Lempia Summerfield Katz LLC

(57) ABSTRACT

A stator for an AFPM motor and a method of manufacturing the stator are disclosed. The stator includes a stator housing having radially extending blades, a stacked core, and a winding coil wound along an outer circumferential surface of the stacked core. The stacked core is coupled to the plurality of blades. The stator has an outer housing coupled to an outer circumferential surface of the stator housing to seal an inner space of the stator housing and has outer ring covers coupled to opposite side surfaces of the stator housing, respectively.

8 Claims, 13 Drawing Sheets

(56) References Cited

U.S. PATENT DOCUMENTS

| | | | |
|---|---|---|---|
| 2004/0098856 A1 | 5/2004 | Kuroyanagi et al. | |
| 2006/0113856 A1 | 6/2006 | Tanno et al. | |
| 2017/0012480 A1 | 1/2017 | Woolmer | |
| 2019/0288584 A1 | 9/2019 | Vansompel | |
| 2022/0060096 A1* | 2/2022 | Li | H02K 16/00 |
| 2022/0085701 A1* | 3/2022 | Versavel | H02K 21/24 |
| 2022/0278579 A1* | 9/2022 | Bossecker | H02K 1/182 |
| 2022/0393543 A1* | 12/2022 | Goykhman | H02K 9/193 |
| 2024/0088766 A1* | 3/2024 | Youn | H02K 21/24 |

FOREIGN PATENT DOCUMENTS

| | | | | |
|---|---|---|---|---|
| JP | H099588 A | | 1/1997 | |
| JP | 2004064990 A | | 2/2004 | |
| JP | 2011130529 A | | 6/2011 | |
| JP | 2017060281 A | * | 3/2017 | H02K 1/14 |
| KR | 20060059205 A | | 6/2006 | |
| KR | 20160031732 A | | 3/2016 | |
| KR | 101686234 B1 | | 12/2016 | |
| KR | 102348964 B1 | * | 1/2022 | H02K 21/24 |

* cited by examiner

STATOR FOR AN AFPM MOTOR AND A METHOD OF MANUFACTURING THE SAME

This application claims the benefit of and priority to Korean Patent Application No. 10-2022-0123048, which was filed on Sep. 28, 2022 and which is hereby incorporated by reference in its entirety as if fully set forth herein.

BACKGROUND

Field of the Disclosure

The present disclosure relates to a stator for an axial flux permanent magnet (AFPM) motor and a method of manufacturing the same, and more particularly to a stator capable of preventing degradation in electromagnetic performance and to a method of manufacturing the same.

Discussion of the Related Art

Generally, a motor includes a rotor in which magnets are installed and includes a stator in which coils are installed. When a voltage is applied to the coils, the rotor is rotated. Of this type of motor, there are two kinds of motors, i.e., an axial flux permanent magnet (AFPM) motor and a radial flux permanent magnet (RFPM) motor.

The AFPM motor has characteristics of a very small axial length, as compared to the RFPM motor. Such characteristics are very useful in a driving system requiring a motor having a small axial length.

Although the AFPM motor has been developed in the form of a coreless motor, i.e., not including a core, such a coreless motor has problems in that a wide void is required because a coil should be disposed at the void. Thus, significant loss is generated, and electromagnetic loss is also significant as compared to a cored motor. Further, an output of the motor per unit volume is low.

SUMMARY

Accordingly, the present disclosure is directed to a stator for an axial flux permanent magnet (AFPM) motor and a method of manufacturing the same that substantially obviate one or more problems due to limitations and disadvantages of the related art.

Objects of the present disclosure are to provide a stator for an AFPM motor capable of maintaining a small void length and to provide a method of manufacturing the same.

Further objects of the present disclosure are to provide a stator for an AFPM motor capable of preventing electromagnetic loss possibly generated in a support structure thereof and to provide a method of manufacturing the same.

Additional advantages, objects, and features of the disclosure ware set forth in part in the following detailed description and in part should become apparent to those having ordinary skill in the art upon examination of the present disclosure or may be learned from practice of the disclosed technical concept. The objectives and other advantages of the present disclosure may be realized and attained by the structure particularly pointed out in the written description and the claims hereof as well as the appended drawings.

To achieve these objects and other advantages and in accordance with the purpose of the disclosure, as embodied and broadly described herein, a stator for an axial flux permanent magnet (AFPM) motor is provided. The stator includes a stator housing having a plurality of blades that extend radially and having side surfaces. The stator also includes a stacked core having a winding coil wound along an outer circumferential surface of the stacked core. The stacked core is coupled to the plurality of blades. The stator also includes an outer housing coupled to an outer circumferential surface of the stator housing to seal an inner space of the stator housing. The stator also includes outer ring covers, one each coupled to a corresponding one of the side surfaces of the stator housing.

The plurality of blades may be made of a non-magnetic and non-conductive polymer material.

The plurality of blades may extend radially outward from an outer circumferential surface of a body having a circular ring shape in a longitudinal direction. The plurality of blades may be arranged in pairs.

The plurality of blades may extend from the outer circumferential surface of the body while being spaced apart from one another by a constant distance.

The stacked core may be coupled in a fitting manner in a direction toward the body of the stator housing.

Each blade of the plurality of blades may include a sliding guide configured to guide the stacked core.

The stacked core may have a tapered shape.

An O-ring may be disposed between each of the outer ring covers and the outer housing.

The outer housing may include a plurality of first coupling protrusions at an outer circumferential surface thereof, and each of the plurality of first coupling protrusions may be formed with a bolt insertion hole.

Each of the outer ring covers may include a plurality of second coupling protrusions respectively corresponding to the first coupling protrusions of the outer housing.

The stator housing, the stacked core, and the outer ring covers may be molding-treated using an adhesive.

In another aspect of the present disclosure, a method of manufacturing a stator for an axial flux permanent magnet (AFPM) motor is provided. The method includes: coupling a stacked core with a coil wound thereon to a plurality of blades provided on a stator housing. The method also includes coupling an outer housing to an outer circumferential surface of the stator housing. The method also includes coupling an outer ring cover to each opposite side surface of the stator housing, respectively. The method also includes molding-treating the stator housing, the stacked core, and the outer ring covers using an adhesive.

Coupling the stacked core may include coupling the stacked core in a fitting manner in a direction toward a body of the stator housing.

Coupling the outer ring covers may include disposing an O-ring between each of the outer ring covers and the outer housing and fastening the outer ring covers and the outer housing to each other using bolts.

It is to be understood that both the foregoing general description and the following detailed description of the present disclosure are by way of example and explanatory and are intended to provide further explanation of the technical concept of the disclosure as claimed.

BRIEF DESCRIPTION OF THE DRAWINGS

The accompanying drawings, which are included to provide a further understanding of the present disclosure and are incorporated in and constitute a part of this application, illustrate embodiments of the disclosure and, along with the description, serve to explain the principles of the disclosed technical concepts. In the drawings.

DETAILED DESCRIPTION

Figure 1:
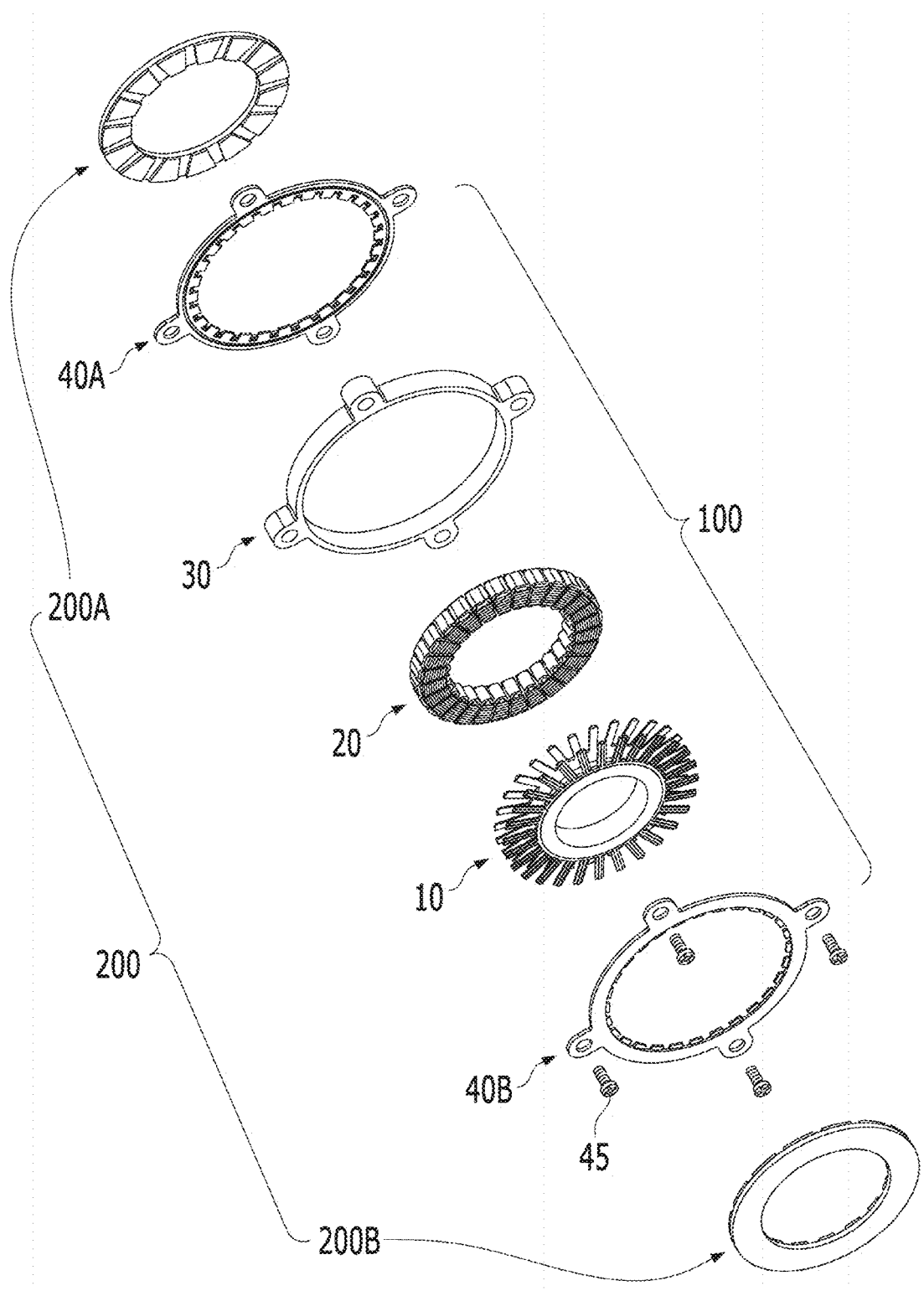
FIG. 1 is an exploded perspective view showing configurations of a stator and a rotor of an AFPM motor to which an AFPM motor stator according to an embodiment of the present disclosure is applied.

For embodiments of the present disclosure described herein, specific structural or functional descriptions are examples to merely describe the embodiments of the present disclosure, and the embodiments of the present disclosure can be implemented in various forms and should not be interpreted as being limited to the embodiments described in the present specification.

Embodiments may be variously varied and may have various forms. In connection with this, specific embodiments are illustrated in the drawings and are described in detail in the specification, but embodiments should not be construed as limited to the specific embodiments disclosed. It is to be appreciated that all changes, equivalents, and substitutes that do not depart from the spirit and technical scope of the embodiments are encompassed in the claims and embodiments.

It should be understood that, although terms such as "first," "second," etc. may be used herein to distinguish various elements from one another, these elements should not be limited by these terms. For example, a first constituent element may be referred to as a second constituent element, and, conversely, the second constituent element may be referred to as the first constituent element, without limiting the scope of embodiments.

In the case where an element is "connected" or "linked" to another element, it should be understood that the element may be directly connected or linked to the other element, or another element may be present therebetween. Conversely, in the case where an element is "directly connected" or "directly linked" to another element, it should be understood that no other element is present therebetween. Other expressions describing a relation between constituent elements, such as "between" and "immediately between", or "adjacent to" and "directly adjacent to", and the like, should be construed in a similar manner.

It should be noted that the terms used herein are merely used to describe a specific embodiment, not to limit the present disclosure. Incidentally, unless clearly used otherwise, singular expressions include a plural meaning. In this application, terms such as "comprising," "including," or the like, and variations thereof, are intended to express the existence of the characteristic, the numeral, the step, the operation, the element, the part, or the combination thereof. Such terms do not exclude another characteristic, numeral, step, operation, element, part, or any combination thereof, or any addition thereto.

Unless defined otherwise, terms used herein including technological or scientific terms have the same meaning as generally understood by those of ordinary skill in the art to which the disclosure pertains. Also, terms used herein shall be interpreted not only based on the definition of any dictionary but also the meaning that is used in the field to which the disclosure pertains. In addition, unless clearly defined, the terms used herein shall not be interpreted more ideally or formally. When a component, device, element, or the like, of the present disclosure, is described as having a purpose or performing an operation, function, or the like, the component, device, or element should be considered herein as being "configured to" meet that purpose or to perform that operation or function.

Meanwhile, in some alternative implementations, the functions noted in a particular block may occur out of the order noted in a flowchart. For example, two blocks shown in succession may, in fact, be executed substantially concurrently, or the blocks may sometimes be executed in the reverse order, depending upon the functionality involved.

Hereinafter, an axial flux permanent magnet (AFPM) motor and a method of manufacturing the same according to embodiments of the present disclosure are described with reference to the accompanying drawings.

Figure 2:
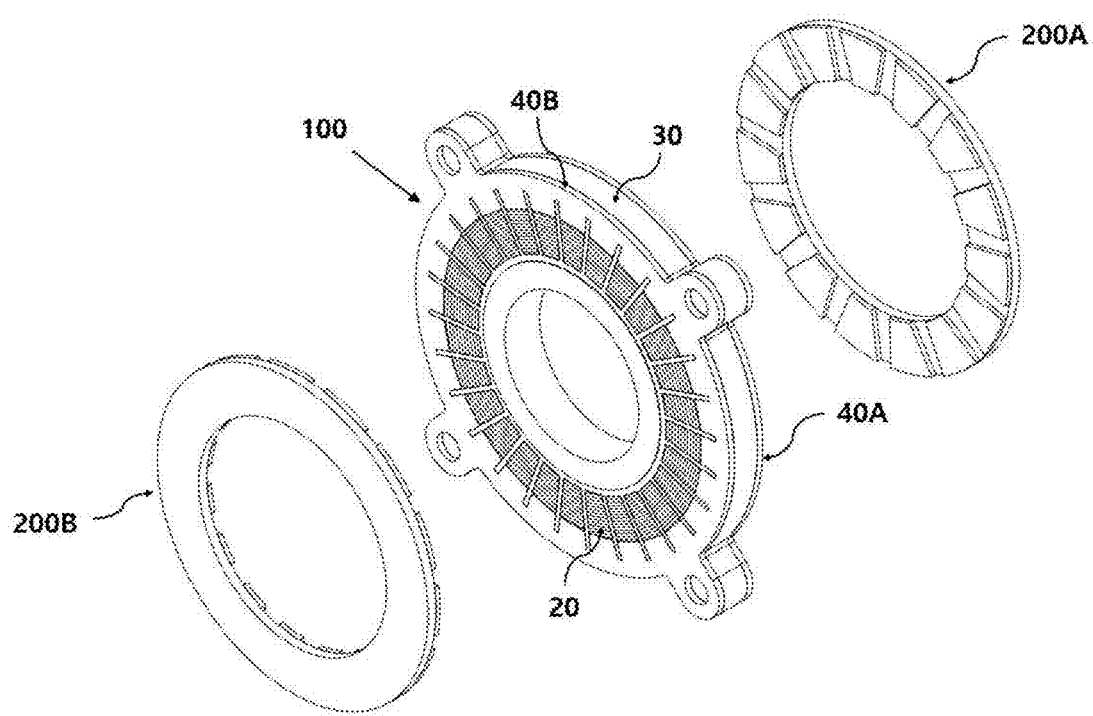
FIG. 2 is an exploded perspective view of the AFPM motor in which rotors are disposed at opposite sides of the AFPM stator according to an embodiment of the present disclosure, respectively, when the AFPM stator is assembled.

FIG. 1 is an exploded perspective view showing configurations of a stator and a rotor of an AFPM motor to which an AFPM motor stator according to an embodiment of the present disclosure is applied. FIG. 2 is an exploded perspective view of an AFPM motor in which rotors are disposed at opposite sides in an axial direction of an assembled AFPM stator according to an embodiment of the present disclosure, respectively.

The AFPM motor includes a stator 100 and a rotor 200. The stator 100 includes a stator housing 10 and a stacked core 20 coupled to the stator housing 10. The stator 100 also includes an outer housing 30 coupled to the stator housing while surrounding an outer circumferential surface of the stator housing 10. The stator 100 also includes a pair of outer ring covers 40A and 40B. Each ring cover 40a, 40B is coupled to an opposite side surface in an axial direction, i.e., axial facing surfaces, of the stator housing 10, respectively. The rotor 200 includes a pair of rotors 200A and 200B. Each rotor 200A, 200B is coupled to an opposite side surface in an axial direction of the stator 100, respectively.

Figure 3:
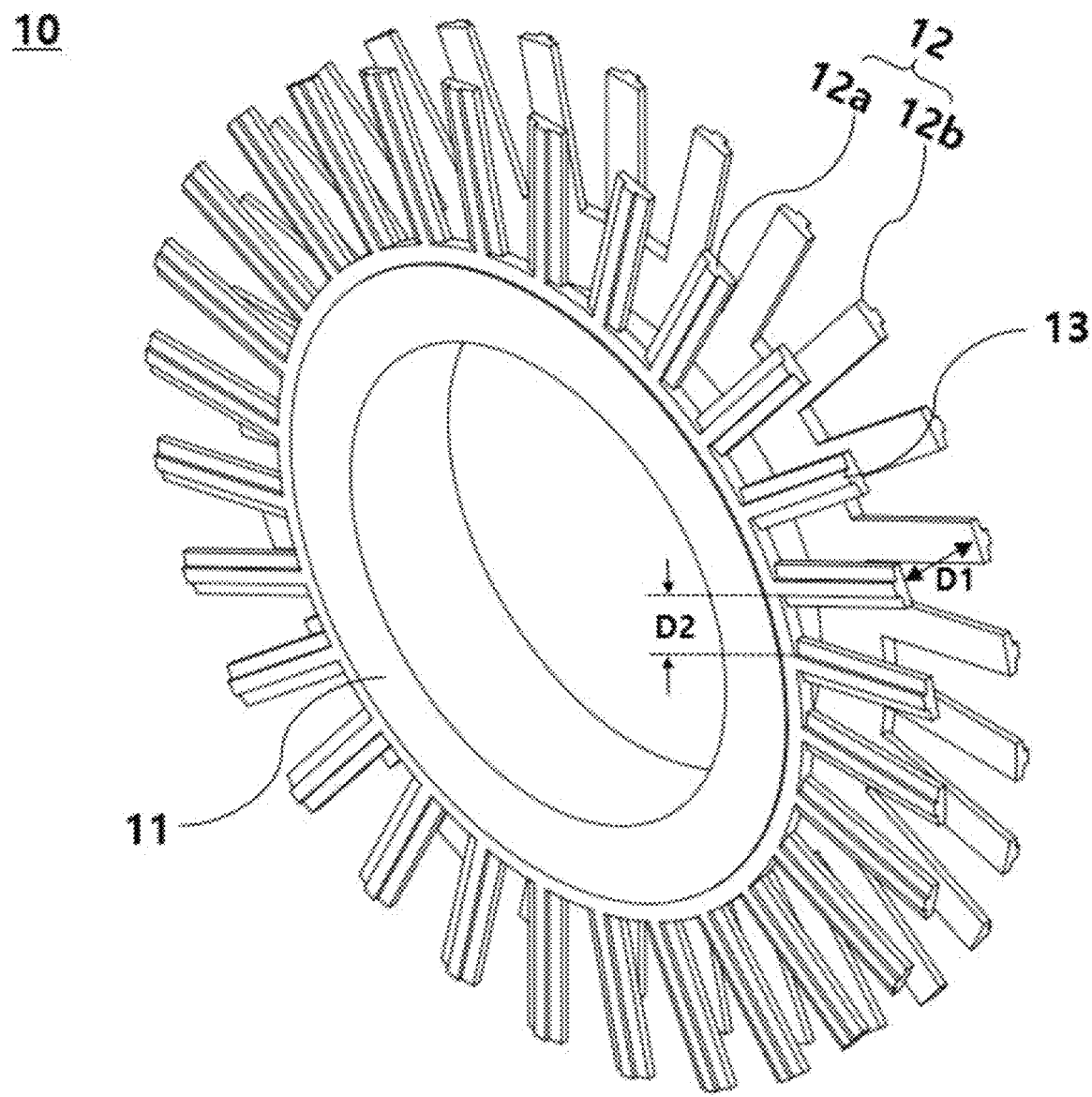
FIG. 3 is a perspective view of a stator housing of an AFPM motor stator according to an embodiment of the present disclosure.

FIG. 3 is a perspective view of the stator housing 10 of the AFPM motor stator 100 according to the embodiment of the present disclosure. As shown in FIG. 3, the stator housing 10 includes a body 11 having a circular ring or annular shape. The stator housing 10 also includes a plurality of blades 12 that extend in a radially outward direction from an outer circumferential surface of the body 11. The blades 12 are arranged in pairs 12a and 12b that are spaced apart in a longitudinal or axial direction.

The plurality of blades 12 is made of a non-magnetic and non-conductive polymer material. Since the stator housing 10 should not be damaged by a torque generated due to electromagnetic force, the polymer material should have sufficiently high stiffness and should also be sufficiently heat resistant in accordance with a driving temperature of the motor.

In each pair of blades 12a and 12b, the blades 12a and 12b are spaced apart from each other in an axial direction by a predetermined distance D1. The blades 12a extend radially from the outer circumferential surface of the body 11 and are spaced apart from one another in a circumferential direction by a constant distance D2, i.e., the blades 12a are consistently or equally spaced apart by the distance D2 around the body 11. Likewise, the blades 12b extend radially from the outer circumferential surface of the body 11 and are spaced equidistant apart from one another by the constant distance D2 around the body 11. A sliding guide 13, which guides the stacked core 20, is formed at an outer surface of each of the blades 12a and 12b.

Figure 4A:
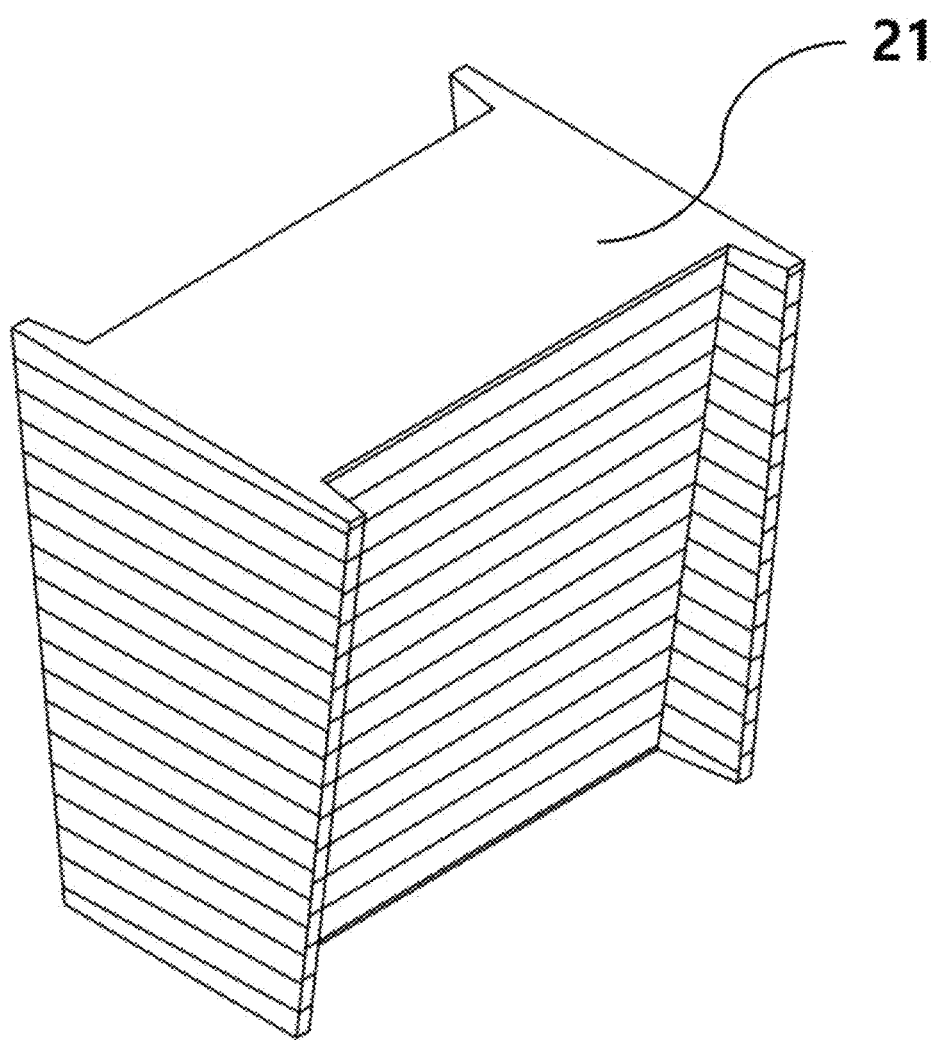
FIG. 4A is a perspective view showing an "I"-shaped stacked core of an AFPM motor stator according to an embodiment of the present disclosure.
Figure 4B:
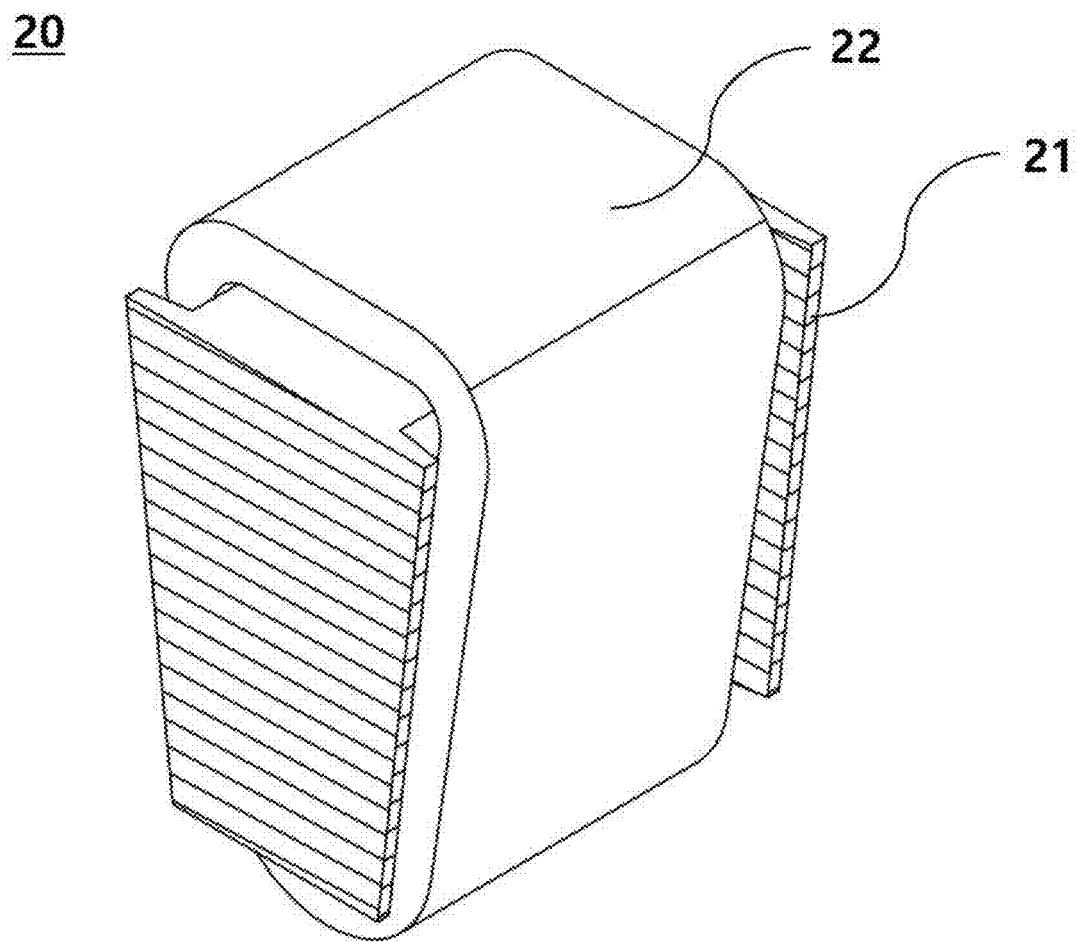
FIG. 4B is a perspective view of the stacked core of FIG. 4A, on which a coil is wound, in an AFPM motor stator according to an embodiment of the present disclosure.
Figure 4C:
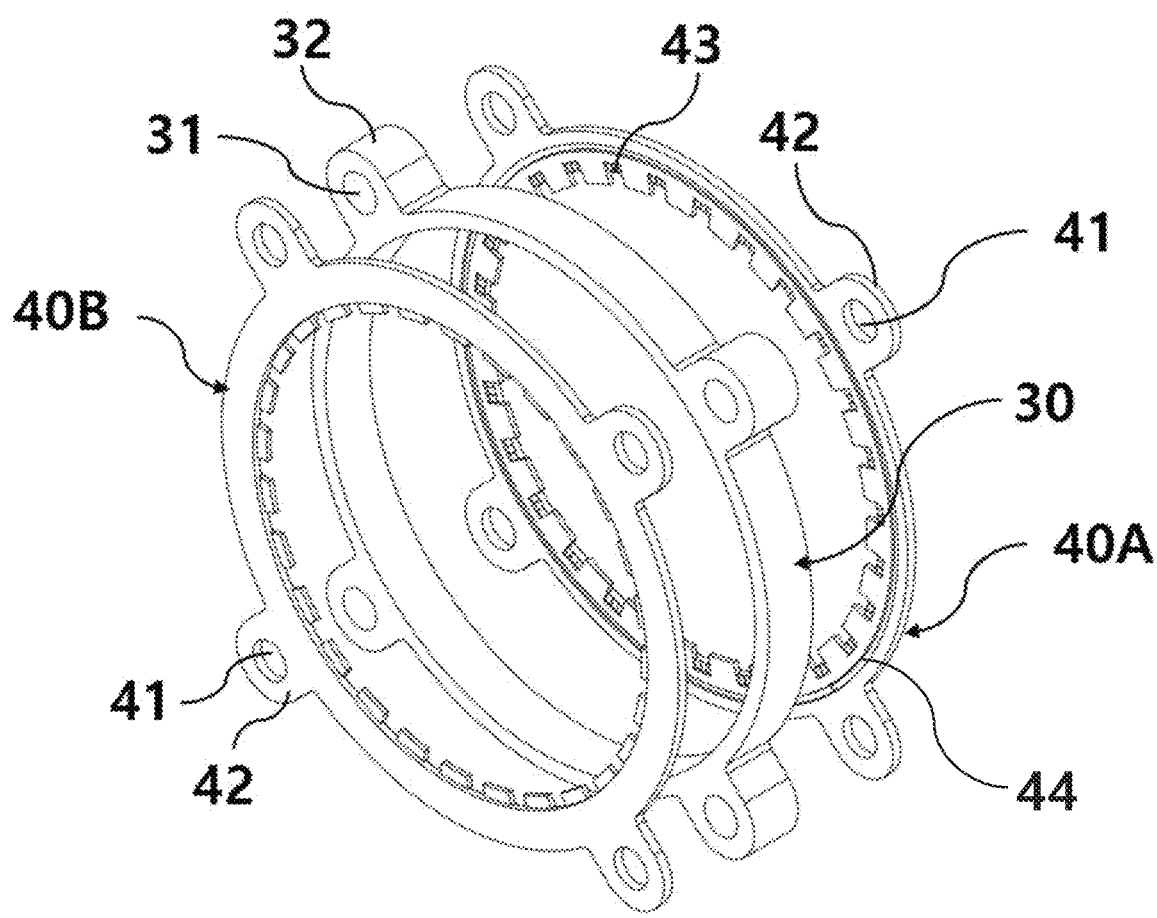
FIG. 4C is a perspective view showing an outer ring cover and an outer housing coupled to a stator housing in an AFPM motor stator according to an embodiment of the present disclosure.

FIG. 4A is a perspective view showing an "I"-shaped stacked core 21 of the AFPM motor stator according to the embodiment of the present disclosure. FIG. 4B is a perspective view of the stacked core, on which a coil 22 is wound, in the AFPM motor stator according to the embodiment of the present disclosure. FIG. 4C is a perspective view showing the outer ring covers 40A and 40B and the outer housing 30 coupled to the stator housing 10 in the AFPM motor stator according to the embodiment of the present disclosure.

As shown in FIGS. 4A-4C, the core 20 according to the embodiment of the present disclosure has a structure in which a plurality of "I"-shaped cores 21 is stacked. In this case, the "I"-shaped cores 21 are configured such that an upper one thereof has a greater size than that of a lower one thereof and, as such, form a tapered shape in a stacked state.

Meanwhile, the outer housing 30 and the outer ring covers 40A and 40B are configured as shown in FIG. 4C. The outer housing 30 is coupled to the outer circumferential surface of the stator housing 10 such that an inner space of the stator housing 10 is sealed. A plurality of first coupling protrusions 32 is formed at an outer circumferential surface of the outer housing 30. A bolt insertion hole 31 is formed at a central portion of each of the first coupling protrusions 32.

The outer ring cover is constituted by a pair of outer ring covers, i.e., the outer ring covers 40A and 40B. Each outer ring cover 40A and 40B is coupled to a corresponding opposite side surface of the stator housing 10. An outer circumferential surface of each of the outer ring covers 40A and 40B has a smaller area, i.e., width or thickness in the axial direction, than that of the outer circumferential surface of the outer housing 30. A plurality of second coupling protrusions 42 is formed on the outer circumferential surface of each of the outer ring covers 40A and 40B. The number of the second coupling protrusions 42 is equal to the number of the first coupling protrusions 32 of the outer housing 30.

A bolt insertion hole 41 is formed at a central portion of each of the second coupling protrusions 42. Coupling grooves 43 are formed at an inner surface of each of the outer ring covers 40A and 40B facing the outer surface of the stator housing 10. The coupling grooves 43 are positioned and spaced to receive free or distal ends of the blades 12a and 12b of the stator housing 10, respectively.

Figure 5:
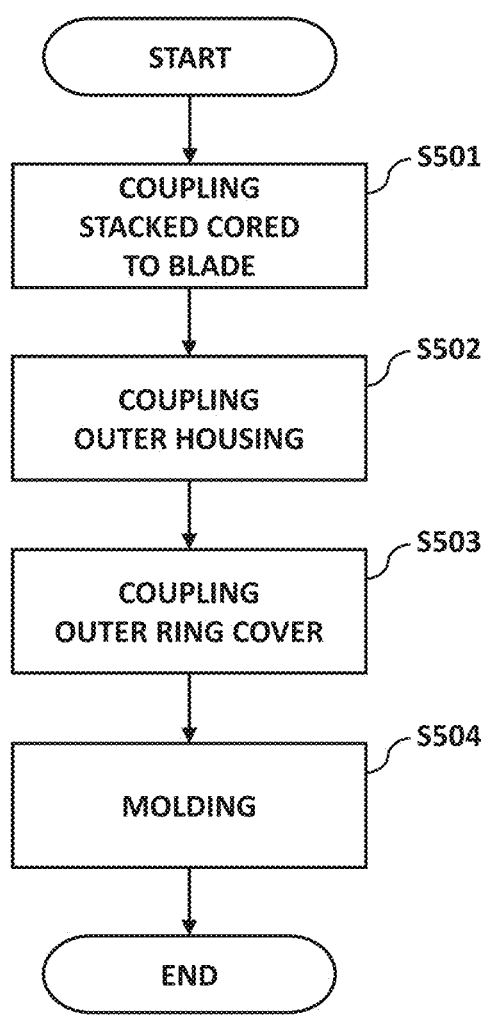
FIG. 5 is a flowchart showing a method of manufacturing an AFPM motor stator in accordance with an embodiment of the present disclosure.

FIG. 5 is a flowchart showing a procedure in a method of manufacturing the AFPM motor stator in accordance with an embodiment of the present disclosure. First, a stacked core 20, on which the coil 22 is wound, is coupled to the plurality of blades 12a and 12b provided on the stator housing 10 (S501).

Figure 6A:
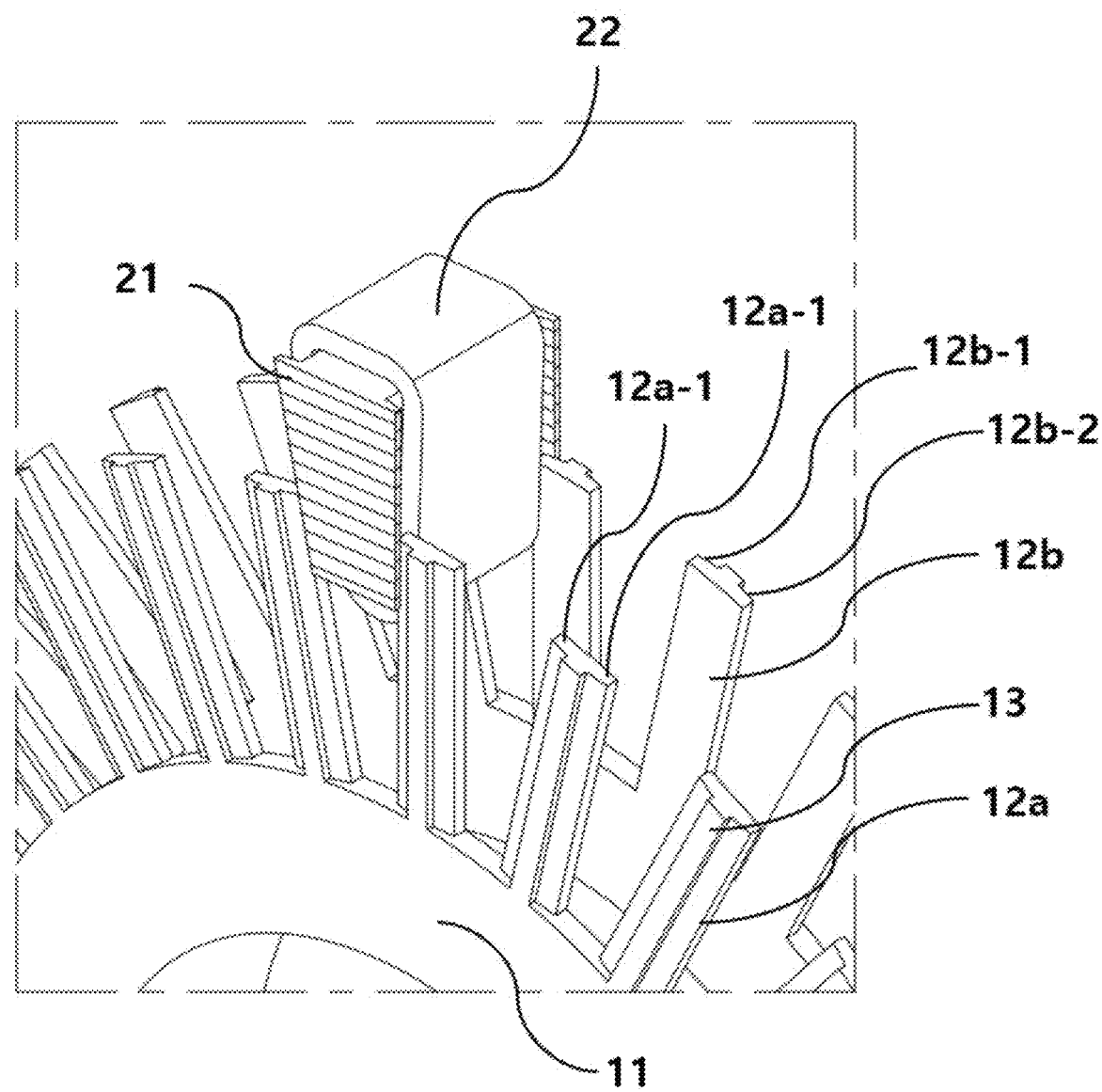
FIG. 6A is a view illustrating coupling of a stacked core to a stator housing in accordance with an embodiment of the present disclosure.
Figure 6B:
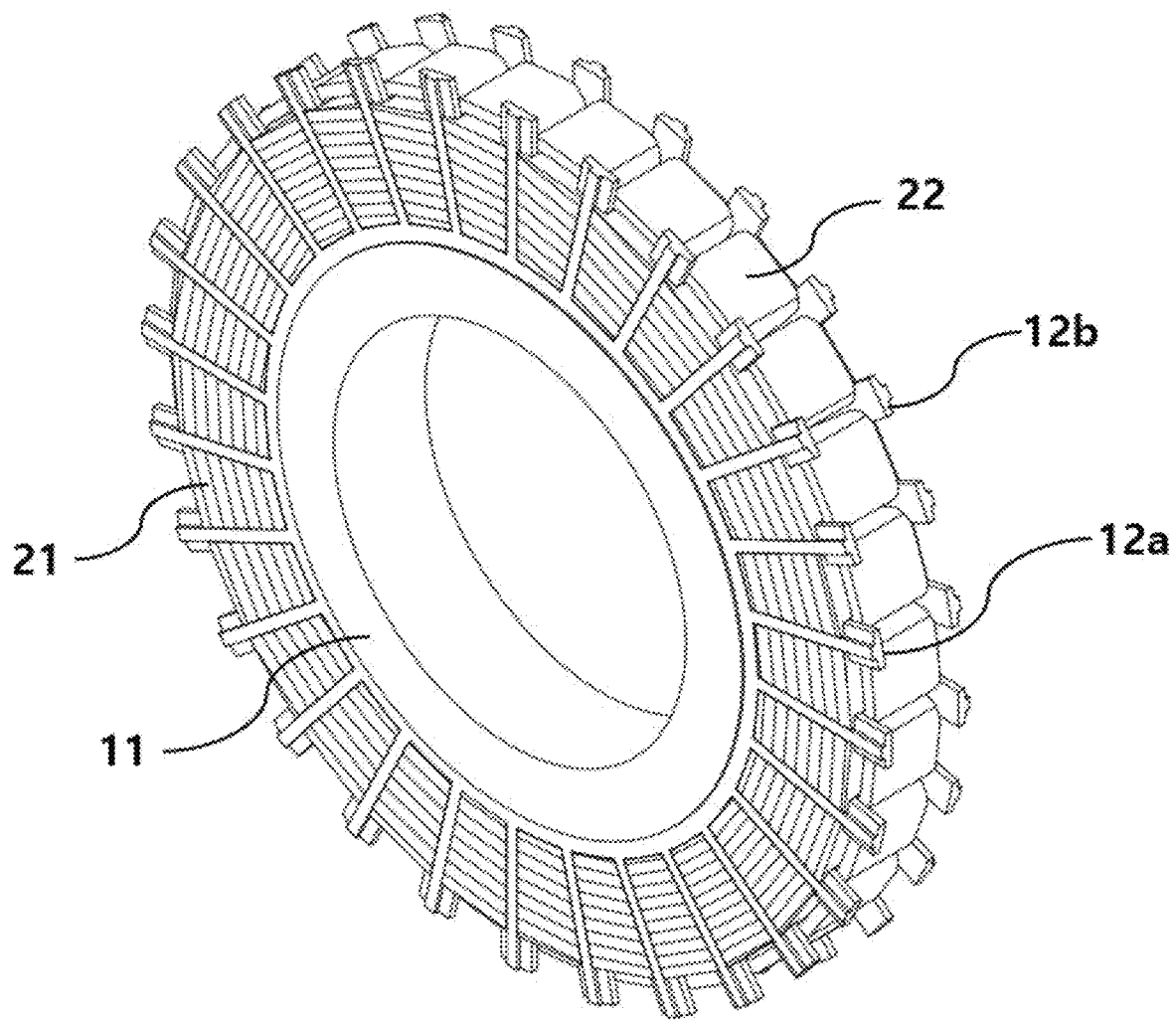
FIG. 6B is a perspective view of the stator housing of FIG. 6A to which the stacked core is coupled.

FIG. 6A is a view illustrating coupling of a stacked core 20 to the stator housing 11. FIG. 6B is a perspective view of the stator housing 11 to which the stacked cores 20 are coupled.

A core 20, in which the coil 22 is wound along outer circumferential surfaces of the stacked "I"-shaped cores 21, is coupled to corresponding ones of the plurality of blades 12a and 12b of the stator housing 10. In other words, lateral wing portions 12a-1 and 12a-2 of each blade 12a and lateral wing portions 12b-1 and 12b-2 of each blade 12b are aligned with gaps defined between the "I"-shaped cores 21 and respective side surfaces of the wound coil 22 in the core 20 corresponding thereto, respectively. In this state, the stacked core 20 is pushed downwards and, as such, is coupled to the corresponding blades 12a and 12b in a fitting manner, in a precise fit. In this case, the sliding guides 13 guide the stacked core 20 such that the stacked core 20 moves stably and easily toward the body 11 of the stator housing 10, thereby causing a lowest one of the "I"-shaped cores 21 to be brought into close contact with the outer circumferential surface of the body 11, as shown in FIG. 6B.

After a plurality of stacked cores 20 is coupled among the plurality of blades 12a and 12b formed at the stator housing 10 in a fitting manner, respectively, the outer housing 30 is coupled to the outer circumferential surface of the stator housing 10 (S502).

Figure 7A:
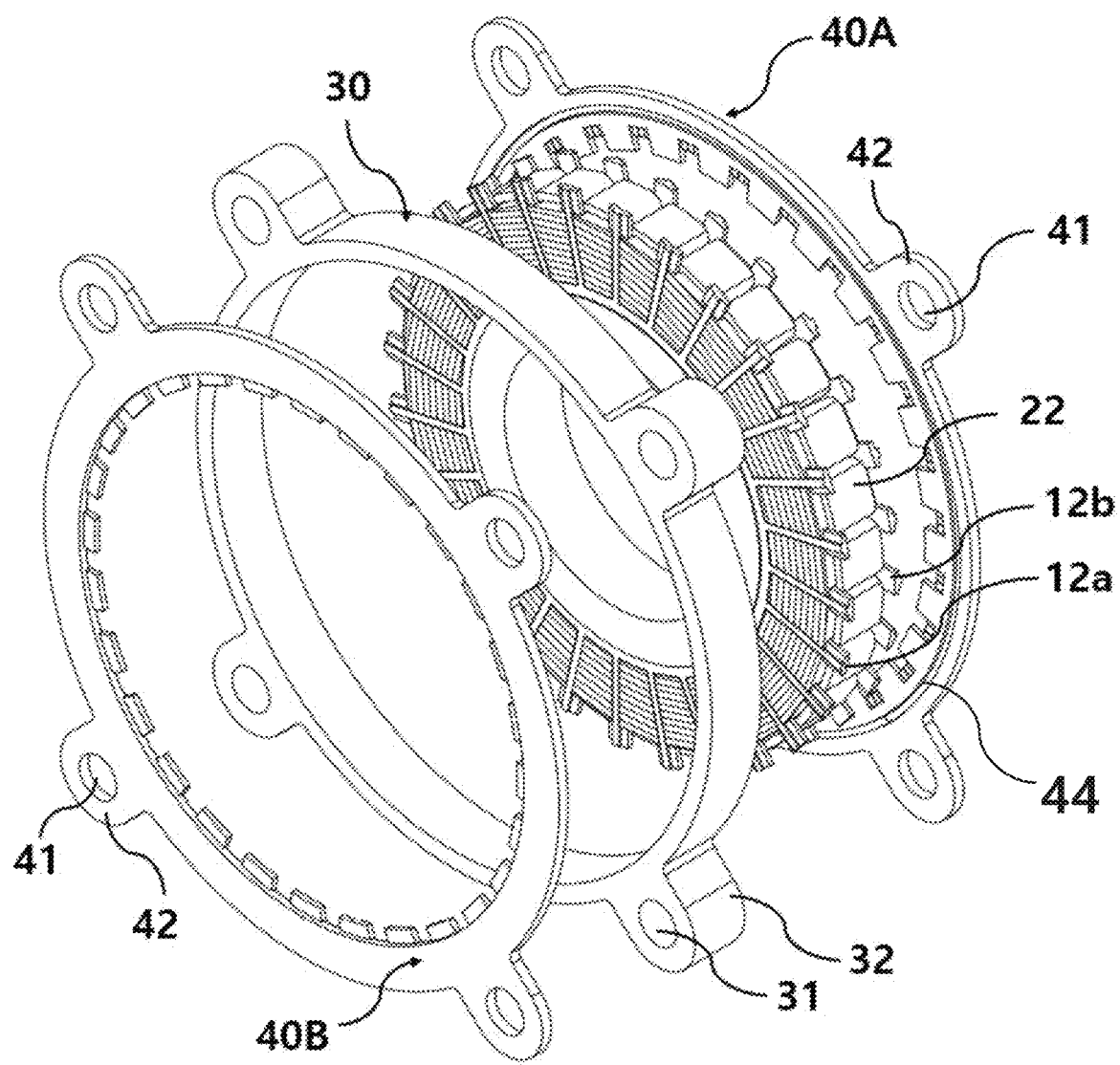
FIG. 7A is a view illustrating coupling between the stator housing of FIG. 6B and outer ring covers in accordance with an embodiment of the present disclosure.

FIG. 7A is a view illustrating coupling between the stator housing 10 and the outer ring covers 40A and 40B. The inner diameter of the outer housing 30 is greater than the outer diameter of the stator housing 10. As the difference between these diameters decreases, the stator housing 10 and the outer housing 20 may be more tightly coupled to each other.

Two outer ring covers 40A and 40B are assembled to the outer housing 30 at opposite side surfaces of the stator housing 10 with the outer housing 30, to which the stator housing 10 has been coupled, interposed between the outer ring covers 40A and 40B. An O-ring 44 is disposed between each of the outer ring cover 40A and 40B and the outer housing 30 in order to provide sealing.

Figure 7B:
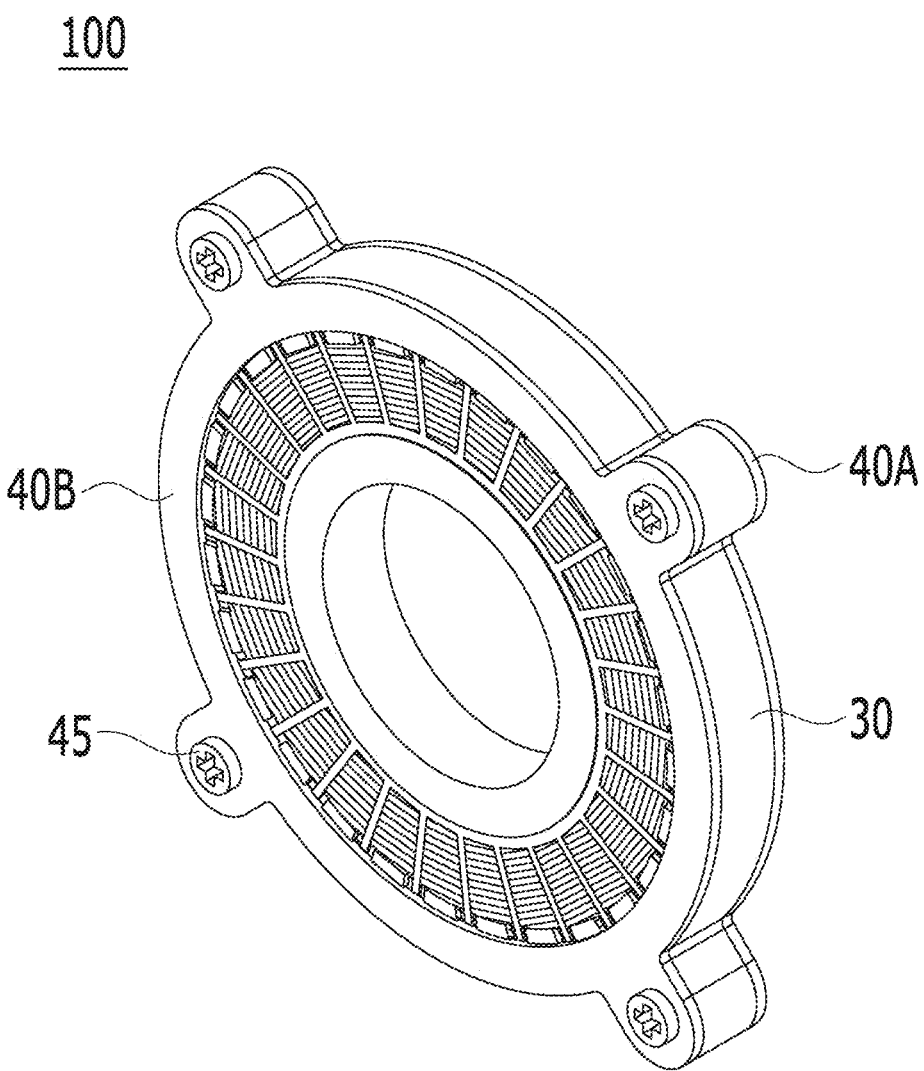
FIG. 7B is a perspective view of the AFPM motor stator of FIG. 7A when assembled.

A bolt 45 is sequentially inserted into each bolt insertion hole 41 formed at the outer ring cover 40B, each bolt insertion hole 31 formed at the outer housing 30, and each bolt insertion hole 41 formed at the outer ring cover 40A and is then fastened. Thus, coupling of the outer ring covers is completed, as shown in FIG. 7B (S503).

In this case, the outer ring covers 40A and 40B are bonded to the stator housing 10 at opposite sides of the stator housing 10 by an adhesive. In this case, sealability preventing leakage of oil, heat resistance, and stiffness preventing easy detachment are required as bonding requirements.

Figure 8:
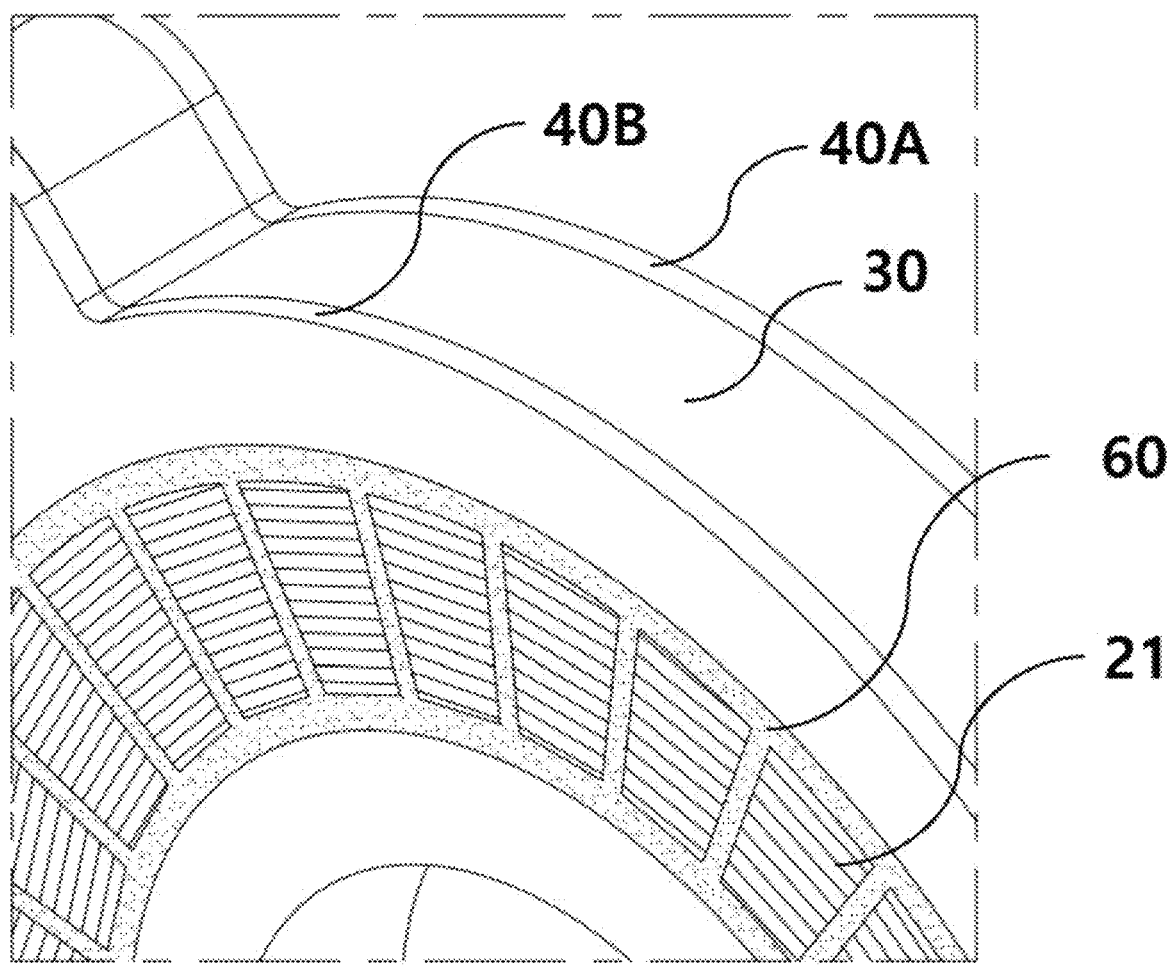
FIG. 8 is a perspective view showing a molding-treated state of an AFPM motor stator according to an embodiment of the present disclosure.

FIG. 8 is a perspective view showing a molding-treated state in the AFPM motor stator according to the embodiment of the present disclosure. The stator housing 10, the stacked core 20, and the outer ring covers 40A and 40B are subjected to molding treatment using an adhesive 60 (S504). The molding treatment is performed using, as the adhesive 60, an adhesive having sufficient adhesiveness for prevention of oil leakage among the stator housing 10, the stacked core 20, and the outer ring covers 40A and 40B, without generation of cracks caused by thermal expansion.

Figure 9:
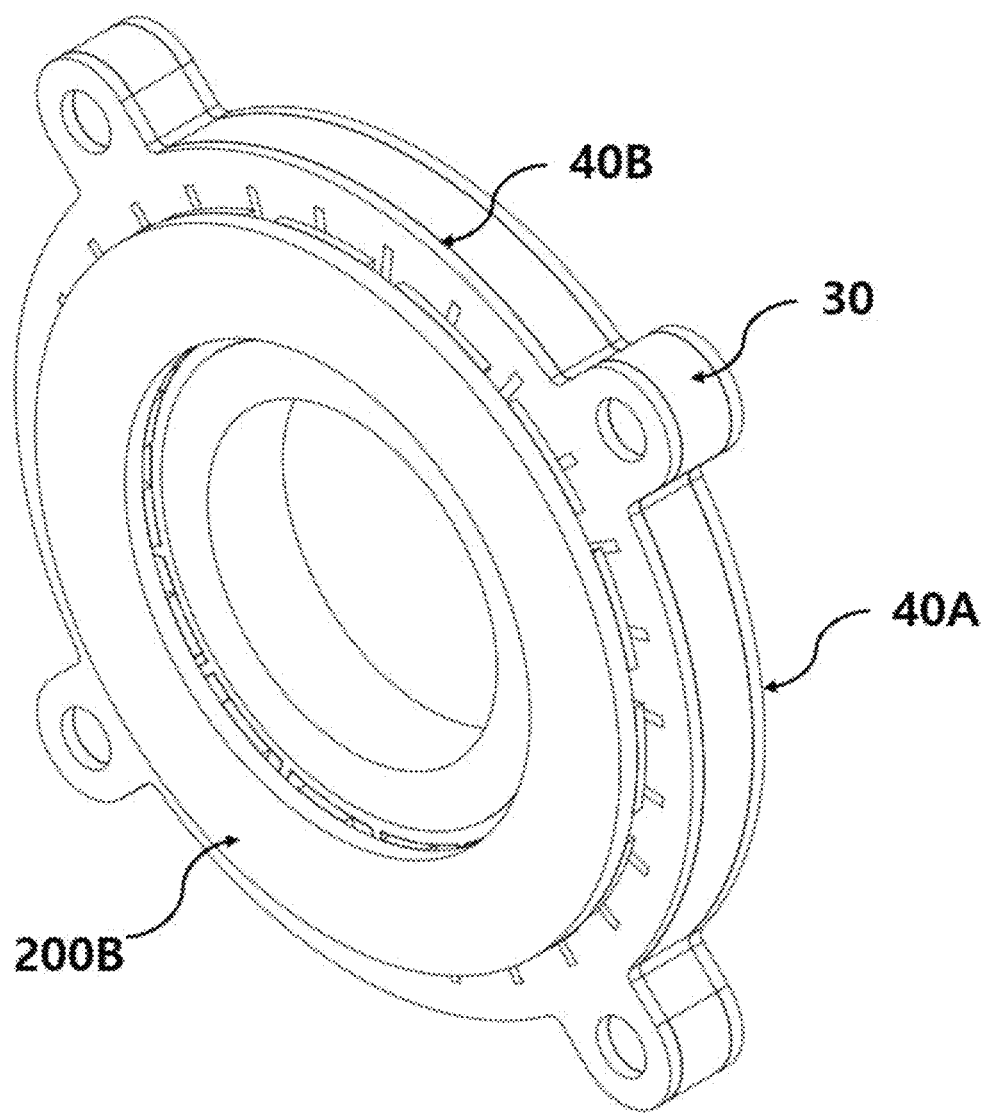
FIG. 9 is a perspective view of an AFPM motor assembled using an AFPM motor stator according to an embodiment of the present invention.

FIG. 9 is a perspective view of the AFPM motor assembled using the AFPM motor stator according to the embodiment of the present disclosure. As shown in FIG. 9, rotors 200A and 200B each having an outer diameter smaller than the inner diameters of the outer ring covers 40A and 40B are coupled to the outer sides of the outer ring covers 40A and 40B, respectively, in a completed state of the motor stator 100. Accordingly, the disc-shaped rotor 200 is disposed at opposite sides of the stator 100 and, as such, the entire structure of the AFPM motor is completed.

The stator of the AFPM motor according to the embodiment of the present disclosure has a direct oil cooling system in which oil directly cools the coil. Sealing is maintained in an interior of the stator support structure in accordance with the molding treatment, and the entirety of the coil is cooled in a state of being immersed in the oil. As the support structure is configured in which oil directly cools the coil, the stator is unrestricted in terms of thermal conductivity characteristics. In addition, the "I"-shaped cores, on which the coils are wound, are coupled among a plurality of blades in a fitting manner, i.e., are precisely fit, such that the "I"-shaped cores closely contact the outer circumferential surface of the body. Thus, an increase in the stacking length between the stator and the rotor is prevented. Accordingly, a reduction in torque may be achieved.

The AFPM motor stator according to the embodiment of the present disclosure may achieve an enhancement in performance of the AFPM motor in that a small void length is maintained, the possibility of electromagnetic loss generated in a support structure is prevented, and the coil is directly cooled using oil. The stator is enabled to be unrestricted in terms of thermal conductivity characteristics.

Although the technical concept of the present disclosure has been described in detail through specific embodiments, those having ordinary skill in the art should appreciate that the motor stator and the manufacturing method therefor are not limited to the disclosed embodiments Modifications and alterations are possible, without departing from the scope and spirit of the disclosure. Simple modifications and alterations fall within the scope of the disclosure, and the scope of protection of the disclosure should be apparent from the appended claims.

What is claimed is:

1. A stator for an axial flux permanent magnet (AFPM) motor, the stator comprising:
   a stator housing having a plurality of blades and side surfaces, wherein the blades are spaced apart from each other in an axial direction by a predetermined distance, and wherein the blades extend radially outward from an outer circumferential surface of a body and are spaced apart from one another in a circumferential direction by a constant distance around the body;
   a plurality of stacked cores coupled to the plurality of blades, wherein an outer circumferential surface of each core of the plurality of stacked cores is wound with a winding coil;
   an outer housing coupled to an outer circumferential surface of the stator housing to seal an inner space of the stator housing; and
   outer ring covers, one each coupled to a corresponding one of the side surfaces of the stator housing,
   wherein the plurality of stacked cores is coupled among the plurality of blades in a fitting manner in a direction toward the body such that the plurality of stacked cores contact the outer circumferential surface of the body, and
   wherein each core of the plurality of stacked cores is arranged along an axial direction within a corresponding blade of the plurality of blades ensuring that the length of each core in the axial direction is less than or equal to the length of the corresponding blade in the same direction.

2. The stator according to claim 1, wherein the plurality of blades is made of a non-magnetic and non-conductive polymer material.

3. The stator according to claim 1, wherein the body has a circular ring shape in a longitudinal direction and the plurality of blades is arranged in pairs to face each other with the predetermined distance as a length of the outer circumferential surface of the body.

4. The stator according to claim 1, wherein the plurality of stacked cores has a tapered shape.

5. The stator according to claim 1, wherein an O-ring is disposed between each of the outer ring covers and the outer housing.

6. The stator according to claim 1, wherein the outer housing comprises a plurality of first coupling protrusions at an outer circumferential surface thereof, and wherein each of the plurality of first coupling protrusions is formed with a bolt insertion hole.

7. The stator according to claim 6, wherein each of the outer ring covers comprises a plurality of second coupling protrusions respectively corresponding to the first coupling protrusions of the outer housing.

8. The stator according to claim 1, wherein the stator housing, the plurality of stacked cores, and the outer ring covers are bonded with a molded adhesive.

* * * * *